United States Patent
Ono (10) Patent No.: US 6,801,480 B2
(45) Date of Patent: Oct. 5, 2004

(54) OPTICAL DISK DRIVE APPARATUS CAPABLE OF BRAKING THE OPTICAL HEAD AT HALF TRACK SHORT OF TARGET TRACK

(75) Inventor: Takayuki Ono, Osaka (JP)

(73) Assignee: Funai Electric Co., Ltd, Osaka (JP)

(*) Notice: Subject to any disclaimer, the term of this patent is extended or adjusted under 35 U.S.C. 154(b) by 249 days.

(21) Appl. No.: 10/043,301

(22) Filed: Jan. 14, 2002

(65) Prior Publication Data

US 2002/0097642 A1 Jul. 25, 2002

(30) Foreign Application Priority Data

Jan. 22, 2001 (JP) .................................... P 2001-013786

(51) Int. Cl.$^7$ .............................................. G11B 21/08
(52) U.S. Cl. ................................ 369/30.17; 369/30.16
(58) Field of Search ........................... 369/30.17, 30.16, 369/30.1, 30.11, 30.12, 30.13, 30.14, 44.28, 44.27, 44.29, 44.35

(56) References Cited

U.S. PATENT DOCUMENTS

| 5,220,547 | A | * | 6/1993 | Yasukawa et al. | ....... 369/30.16 |
|---|---|---|---|---|---|
| 5,408,454 | A | * | 4/1995 | Hasegawa | ................ 369/44.25 |
| 5,623,464 | A | * | 4/1997 | Tani | ........................ 369/44.28 |
| 5,675,560 | A | * | 10/1997 | Ogino | ..................... 369/30.17 |
| 5,699,332 | A | * | 12/1997 | Nakano | .................... 369/30.16 |

FOREIGN PATENT DOCUMENTS

| JP | 8-263849 | 10/1996 |
|---|---|---|
| JP | 10-340459 | 12/1998 |

* cited by examiner

*Primary Examiner*—Tan Dinh
(74) *Attorney, Agent, or Firm*—Morgan, Lewis & Bockius, LLP (57) ABSTRACT

When a lens 4a reaches a position which is a half track short of an objective track in a track jump, a servo processor 7 conducts a braking operation of an amount corresponding to the movement velocity of the lens 4a at the timing when the lens crosses the immediately preceding track. The movement velocity of the lens 4a is detected from the period of a tracking error signal. Therefore, a phenomenon in which a braking operation is not effective and the lens overshoots the objective track is prevented from occurring, and a track-on in the objective track can be surely attained.

12 Claims, 4 Drawing Sheets

OPTICAL DISK DRIVE APPARATUS CAPABLE OF BRAKING THE OPTICAL HEAD AT HALF TRACK SHORT OF TARGET TRACK

BACKGROUND OF THE INVENTION

1. Technical Field

The present invention relates to an optical disc apparatus which reads and writes data to an optical disc such as a CD, an MD, or a DVD.

Particularly, the invention relates to a control of a track jump in which a pickup head is moved to an objective track formed in a recording surface of an optical disc.

2. Related Art

Conventionally, there is an optical disc apparatus which reads data recorded on an optical disc such as a CD, an MD, or a DVD, and which writes data to such an optical disc. In an optical disc, a plurality of tracks are formed concentrically or spirally on a recording face. An optical disc apparatus detects a reflected light beam of a light beam illuminating the tracks to read out recorded data, and irradiates the tracks with a light beam to write data thereto.

When data recorded on an optical disc are to be read out, or when data are to be recorded to an optical disc, an optical disc apparatus performs a track jump for moving a pickup head to an objective one of many tracks formed in a recording surface of the optical disc. An objective track is a track from which data are to be read out, or into which data are to be written. A track jump is an operation of moving an illumination position of a light beam in a radial direction of the optical disc to place the illumination position of the light beam on the objective track.

Hereinafter, a track jump will be described. In a track jump, used is a tracking error signal indicative of the degree of deviation in a radial direction between the illumination position of the light beam and a track formed in the recording surface. The tracking error signal is obtained from a light beam which is reflected from the optical disc, and which is detected while moving the illumination position of the light beam in a radial direction of the optical disc.

In a usual optical disc apparatus, a pickup head is placed on a thread which is movable in a radial direction of an optical disc. A lens of the pickup head is attached so as to be movable on the thread in a radial direction of the optical disc. A track jump is conducted with moving the thread, or without moving the thread.

A track jump which is conducted with moving the thread will be described.

The optical disc apparatus moves the thread in a radial direction of the optical disc. This causes the main unit of the pickup head placed on the thread to be moved in a radial direction of the optical disc, and hence the center (the illumination position of the light beam) of the lens crosses sequentially tracks formed in the recording surface of the optical disc. At this time, also the movement of the lens of the pickup head with respect to the thread is conducted. A mirror portion which totally reflects a light beam is formed between adjacent tracks. A sinusoidal tracking error signal indicating that the center of the lens crosses a track is obtained from the amount of reflected light from the optical disc. One wavelength of the tracking error signal is produced each time the center of the lens crosses a track. When the wave number of the tracking error signal is counted, therefore, it is possible to obtain the number of tracks which the center of the lens has crossed.

Immediately before the start of a track jump, the optical disc apparatus calculates the number of tracks which are to be crossed before the center of the lens reaches the objective track position. Specifically, the number of tracks which are to be crossed is calculated from the difference between a track address indicative of the current track position of the pickup head, and that indicative of the objective track position. The current track position is obtained by reading data of the track.

When the center of the lens reaches a position which is separated by a certain distance from the objective track, the optical disc apparatus stops the thread. For example, the thread is stopped when the center of the lens reaches a track which is 100 tracks short of the objective track. When the optical disc apparatus moves the thread in this way, the main unit of the pickup head is moved to the vicinity of the objective track.

The movement of the lens with respect to the thread is continued even after the thread is stopped, so that the center of the lens is kept to be moved toward the objective track. When it is judged from the counted wave number of the tracking error signal that the center of the lens reaches the objective track, the optical disc apparatus conducts a tracking servo control to attain a track-on in the objective track.

A tracking servo control is a control of positioning the center of the lens on the center of a track.

In the case where the movement velocity of the lens is not substantially zero, the track pull-in is sometimes failed even when a tracking servo control is conducted, and hence a track-on in the objective track cannot be attained. Therefore, a control is conducted so that, when the center of the lens reaches a position which is separated by a certain distance from the objective track, the movement velocity is gradually reduced, and, when the center of the lens reaches the objective track position, the movement velocity is made substantially zero.

For example, a method is proposed in which, when the center of a lens reaches the objective track position, a braking operation is conducted so as to make the movement velocity of the lens substantially zero, and a tracking servo control is then conducted (the Unexamined Japanese Patent Application Publication No. Hei08-263849).

An optical disc apparatus is proposed in which the movement velocity of a thread is made constant during a track jump, whereby the control of the timing of conducting a braking operation is facilitated (the Unexamined Japanese Patent Application Publication No.Hei10-340459). The publication discloses a technique in which the rotational speed of a thread motor for moving a thread is made constant, thereby making the movement velocity of the thread constant.

3. Problems to Be Solved

However, the amount of braking which is applied when it is detected that the center of the lens reaches the objective track position is constant. When the movement velocity of the lens immediately before a braking operation is conducted is high, therefore, the lens fails to stop in the objective track position, and overshoots the position. When the movement velocity of the lens immediately before a braking operation is conducted is low, the braking is excessively applied, and the center of the lens is sometimes returned with respect to an optical disc. In this context, the return does not mean a movement of the lens in the opposite direction, but means a phenomenon in which the relative movement direction of the lens with respect to the optical disc is oriented in a returning direction (the direction along which the lens is separated from the objective track) because of eccentricity of the optical disc or the like.

Conventionally, immediately after a braking operation is completed, a tracking servo control is conducted so as to attain a track-on in the objective track. However, it is not certain whether, at the timing when a braking operation is completed, the center of the lens is positioned on a track or in a mirror portion formed between tracks. When a tracking servo control is conducted while the center of the lens is positioned in a mirror portion, the drive control cannot be correctly performed, and the lens is sometimes returned or suddenly accelerated, thereby causing track slipping.

In a conventional optical disc apparatus, therefore, it is often that a track-on in the objective track is not attained and a track jump is again conducted. As a result, the time period required for attaining a track-on in the objective track is prolonged, and the reliability of the apparatus main unit is not excellent.

SUMMARY OF THE INVENTION

It is an object of the invention to provide an optical disc apparatus in which, when a movement of a lens is to be stopped, a braking operation of a degree corresponding to the movement velocity of the lens is conducted to enable a track-on to be surely performed in an objective track.

It is another object of the invention to provide an optical disc apparatus in which, when the center of a lens is positioned in a mirror portion, a tracking servo control is prevented from being conducted, so that track slipping is suppressed, to enable a track-on to be surely performed in an objective track.

MEANS FOR SOLVING THE PROBLEMS

In order to solve the problems, the optical disc apparatus of the invention is configured in the following manner.
(1) The optical disc apparatus comprises:
  a pickup head which illuminates a recording surface of an optical disc with a light beam that is focused by a lens, and which detects a reflected light beam from the surface to read data recorded on the optical disc;
  a lens moving section which moves the lens to move an illumination position of the light beam in a radial direction of the optical disc;
  a tracking error signal producing section which produces a tracking error signal indicating that the illumination position of the light beam crosses a track formed on the optical disc;
  a brake signal outputting section which outputs a brake signal for causing the lens moving section to stop the lens which is being moved in a radial direction of the optical disc; and
  an amount of braking controlling section which controls an amount of braking due to the brake signal that is output by the brake signal outputting section, in accordance with a period of the tracking error signal.

In the above configuration, the lens moving section moves the lens of the pickup head to move the illumination position of the light beam in a radial direction of the optical disc. The tracking error signal producing section produces the tracking error signal indicating that the illumination position of the light beam crosses a track formed on the optical disc. The tracking error signal is a sinusoidal signal. The period of the tracking error signal is proportional to the movement velocity of the lens. The amount of braking controlling section controls the amount of braking for stopping the lens of the pickup head in accordance with the period of the tracking error signal.

As a result, the brake signal outputting section outputs a brake signal of the amount of braking which corresponds to the movement velocity of the lens, thereby stopping the lens. For example, when the movement velocity of the lens is high, a brake signal of a large amount of braking is output, and, when the movement velocity of the lens is low, a brake signal of a small amount of braking is output, whereby the lens can be stopped. Therefore, the illumination position of the light beam can be surely stopped on the objective track, and a track-on can be surely performed in the objective track.

(2) The amount of braking controlling section controls the level of the brake signal.
(3) The amount of braking controlling section controls the time period when the brake signal is output.
(4) The amount of braking controlling section controls the level of the brake signal, and a time period when the brake signal is output.

In the above configuration, the amount of braking is controlled by controlling one or both of the degree of braking and the time period of application of braking.

(5) The optical disc apparatus further comprises a track position detecting section which detects a track position illuminated with the light beam, on the basis of the tracking error signal, and
  the brake signal outputting section outputs the brake signal when the illumination position of the light beam detected by the track position detecting section is moved a predetermined distance short of the objective track.

In the configuration, the timing of conducting a braking operation can be easily controlled.

(6) The predetermined distance is a half track.
(7) The apparatus further comprises a tracking servo controlling section which, when the illumination position of the light beam is placed on the track after the output of the brake signal by the brake signal outputting section is completed, starts application of a tracking servo control.

In the configuration, when the illumination position of the light beam is placed on the track after the output of the brake signal is completed, application of a tracking servo control is started. Therefore, track slipping can be surely prevented from occurring, and hence a track-on in an objective track can be performed more surely.

(8) The tracking servo controlling section conducts a track-on when the level of the tracking error signal is lowered below a predetermined level.
(9) The tracking servo controlling section conducts a track-on when the level of the tracking error signal is within a predetermined range and is lowering.

DETAILED DESCRIPTION OF THE PREFERRED EMBODIMENTS

[Mode for Carrying Out the Invention]

Figure 1:
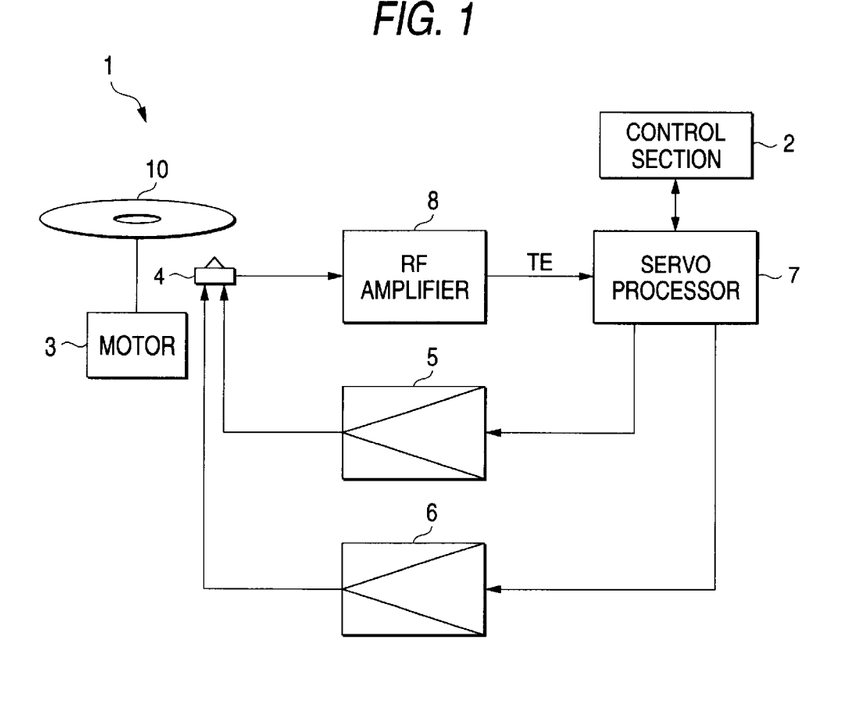
FIG. 1 is a diagram showing the configuration of main portions of an optical disc apparatus which is an embodiment of the invention.

FIG. 1 is a block diagram showing the configuration of main portions of an optical disc apparatus which is an embodiment of the invention. The optical disc apparatus 1 of the embodiment reads data from an optical disc 10 such as a CD, an MD, or a DVD, and writes data to the optical disc 10. The reference numeral 2 denotes a control section which controls the operation of the main unit, and 3 denotes a spindle motor which rotates the optical disc 10 set in the main unit. The reference numeral 4 denotes a pickup head which illuminates the optical disc 10 with a light beam, and which detects a reflected light from the optical disc 10. The pickup head 4 has a light projecting section, a four-split photodiode, and an objective lens 4a.

Figure 2:
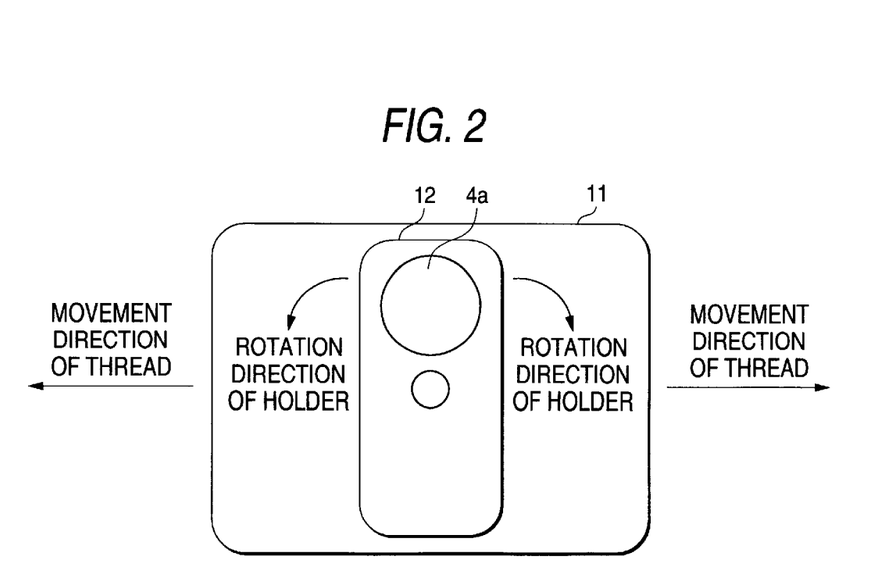
FIG. 2 is view showing a thread and a holder on which a pickup head of the optical disc apparatus of the embodiment of the invention is to be placed.

As shown in FIG. 2, the pickup head 4 is placed on a thread 11. The thread 11 is configured so as to be movable in a radial direction (either of the directions indicated by arrows in FIG. 2) of the optical disc 10 by a thread motor which is not shown. The objective lens 4a of the pickup head 4 is attached to a holder 12. The holder 12 is rotatably attached to a rotation shaft disposed in a position which approximately coincides with the center of the thread 11. The rotation direction of the holder 12 is indicated by arrows in FIG. 2. The holder 12 is rotated by an actuator which is not shown. When the holder 12 is rotated, the lens 4a is moved in a radial direction of the optical disc 10. The holder 12 is configured so as to be movable also in the direction of the rotation shaft of the spindle motor 3 which rotates the optical disc 10.

The reference numeral 5 denotes a tracking driver which supplies a driving signal (a kick signal and a brake signal) to the actuator to cause the holder 12 to be rotated with respect to the thread 11. In accordance with the rotation of the holder 12, the lens 4a is moved in a radial direction of the optical disc 10.

The reference numeral 6 denotes a thread driver which supplies a driving signal (a kick signal and a brake signal) to the thread motor to cause the thread 11 to be moved in a radial direction of the optical disc 10. In accordance with the movement of the thread 11, the main unit of the pickup head 4 is moved in a radial direction of the optical disc 10.

The reference numeral 7 denotes a servo processor which supplies a servo signal to the tracking driver 5 and the thread driver 6, and 8 denotes an RF amplifier which produces a tracking error signal TE and like signals for the optical disc 10 which will be described later.

In the pickup head 4, the split photodiode detects reflected light of the light beam which is emitted from the light projecting section to illuminate the optical disc 10, and the output of the split photodiode is supplied to the RF amplifier 8. On the basis of the signal (the output of the split photodiode) supplied from the pickup head 4, the RF amplifier 8 produces the tracking error signal TE and the like. The produced tracking error signal TE is supplied to the servo processor 7.

In a reproduction process, the RF amplifier 8 produces a reproduction signal based on the output of the split photodiode. The reproduction signal is output from an output section which is not shown. In a record process, the control section 2 controls the light projecting section of the pickup head 4 to write data onto the optical disc 10. The description of details of operations in the reproduction and record processes is omitted.

The tracking error signal TE is a signal indicative of the degree of deviation between the center of a track formed on the optical disc 10 and the illumination position of the light beam. The illumination position of the light beam is opposed to the center of the lens 4a.

When the holder 12 is in the state shown in FIG. 2 with respect to the thread 11, the degree of deviation between the split photodiode and the lens 4a is zero. Hereinafter, the state shown in FIG. 2 is referred to as the reference position of the holder 12 with respect to the thread 11.

The servo processor 7 supplies the tracking servo signal which is produced on the basis of the input tracking error signal TE, to the tracking driver 5. On the basis of the input tracking servo signal, the tracking driver 5 drives the actuator so that the center of the lens 4a, i.e., the illumination position of the light beam is placed on the center of a track.

Figure 3:
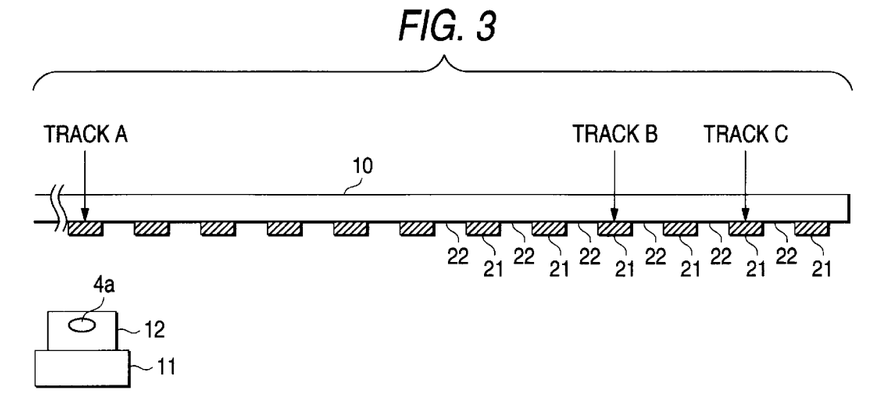
FIG. 3 is a view showing a section of an optical disc.

Hereinafter, the operation of the track jump in the optical disc apparatus 1 of the embodiment will be described. As well known in the art, in the optical disc 10, a plurality of tracks 21 are formed concentrically or spirally on the recording face. A mirror portion 22 is formed between adjacent tracks 21 (see FIG. 3). The mirror portion 22 is a total reflection area. FIG. 3 shows a section of the optical disc 10. The lower face of the disc serves as a recording surface. In reality, the tracks 21 are formed more densely on the optical disc 10.

Hereinafter, an example in which a track jump from track A shown in FIG. 3 to track C will be described. The optical disc apparatus 1 recognizes the positions of tracks A and C in the optical disc 10. It is assumed that tracks A and C are separated from each other by several hundreds of tracks. Also, it is assumed that track B shown in the figure is between tracks A and C, and separated from track C by 100 tracks.

During the track jump operation, the RF amplifier 8 is kept to receive the output of the split photodiode which detects the reflected light of the light beam illuminating the recording surface of the optical disc 10. The RF amplifier 8 produces the tracking error signal TE on the basis of the incoming output of the split photodiode, and supplies the signal to the servo processor 7.

Figure 4:
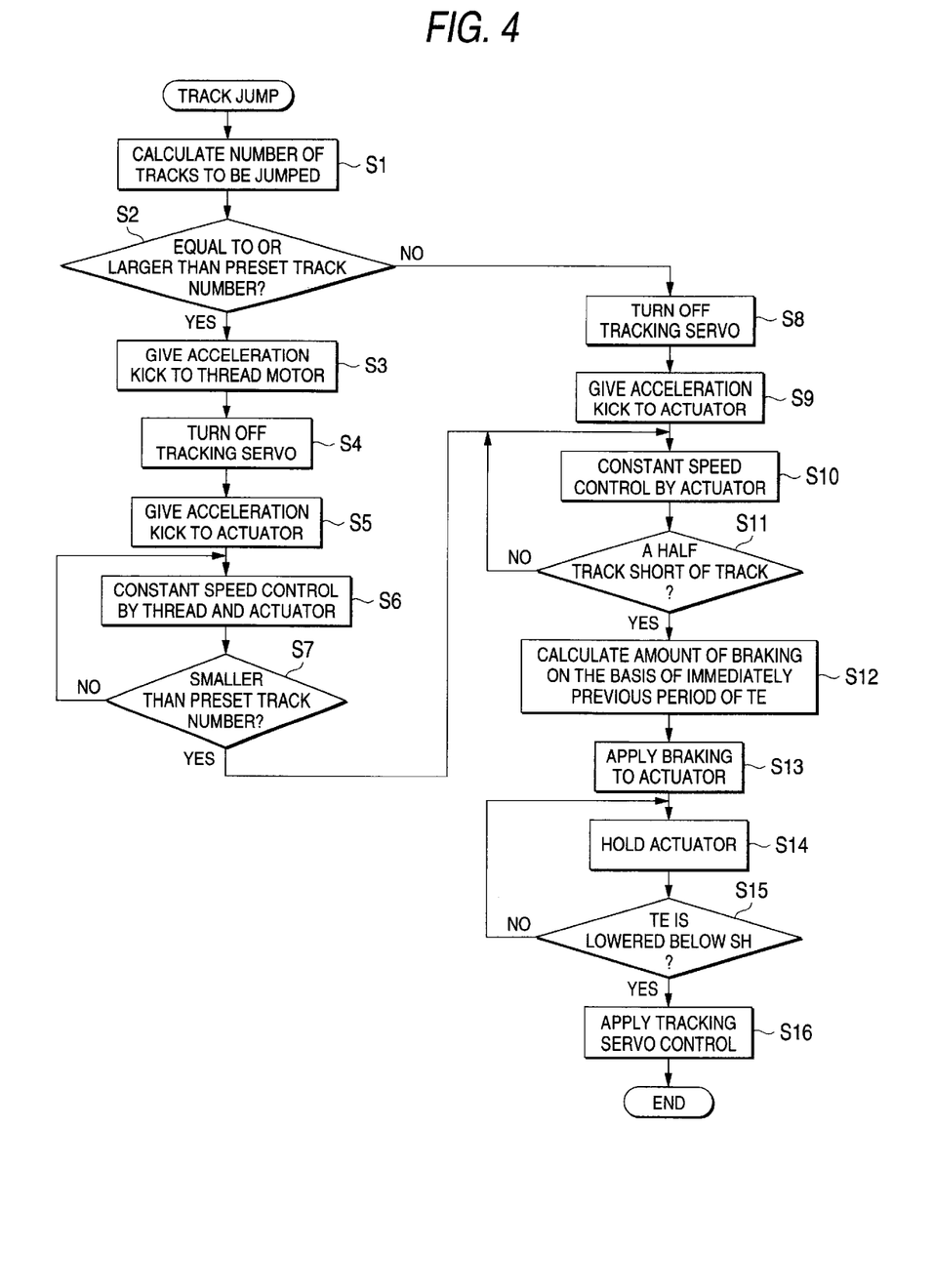
FIG. 4 is a flowchart showing a process of a track jump in the optical disc apparatus of the embodiment of the invention.

FIG. 4 is a flowchart showing the operation of the track jump operation. The optical disc apparatus 1 counts the number of tracks between tracks A and C, i.e., that of tracks which are to be jumped (s1). It is judged whether the track number calculated in s1 is equal to or larger than a track number which is previously set (hereinafter, referred to as preset track number) or not (s2). In this example, the preset track number is 101.

If the track number is equal to or larger than the preset track number, the servo processor 7 supplies an acceleration kick signal of a predetermined level to the thread driver 6 (s3). The tracking servo control is then turned off to cancel the track-on state, and an acceleration kick of a predetermined degree is given to the actuator (an acceleration kick signal of a predetermined level is supplied to the tracking driver 5) (s4 and s5). Thereafter, the lens 4a is moved toward objective track C by a constant speed control using the thread 11 and the actuator (s6).

Figure 5:
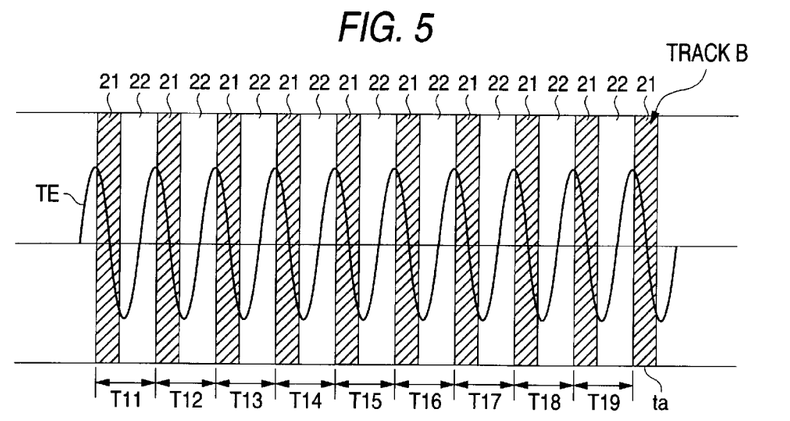
FIG. 5 is a view illustrating a control of movement of the thread in the optical disc apparatus of the embodiment of the invention.

At this time, the pickup head 4 continues to illuminate the recording surface of the optical disc 10 with the light beam, and the RF amplifier 8 continues to receive the output of the split photodiode. The RF amplifier 8 supplies to the servo processor 7 the tracking error signal TE which is produced on the basis of the received output of the split photodiode. The tracking error signal TE is a sinusoidal signal in which one wavelength is produced each time the pickup head 4 crosses one of the tracks 21 as shown in FIG. 5.

The servo processor 7 counts the wave number of the tracking error signal TE which is supplied from the RF amplifier 8, thereby detecting the number of tracks which the pickup head 4 (the center of the lens 4a) has crossed. As a result, it is possible to know the number of tracks between the current position and the objective track (track C). The servo processor 7 conducts the constant speed control of s6 till the number of tracks between the current position and the objective track (track C) becomes smaller than the preset track number, i.e., till the center of the lens 4a reaches track B (s6 and s7).

As described above, the tracking error signal TE is a sinusoidal signal which is output each time the center of the lens 4a crosses one of the tracks 21. Therefore, the period of the tracking error signal TE is varied in accordance with the movement velocity of the thread 11. Specifically, as the movement velocity of the thread 11 is higher, the period of the tracking error signal TE is shorter, and, as the movement velocity of the thread 11 is lower, the period of the tracking error signal TE is longer. In the constant speed control of s6, the servo processor 7 supplies an acceleration kick or a deceleration kick to the tracking driver 5 and the thread driver 6 so that the period of the tracking error signal TE shown in FIG. 5 is constant.

In this way, the optical disc apparatus 1 of the embodiment conducts the constant speed control of s6 on the basis of the tracking error signal TE which is supplied from the RF amplifier 8. Therefore, a mechanism and the like which are used for detecting the rotational speed of the thread motor, and which are required in a conventional apparatus are not required, and hence the production cost of the main unit of the apparatus can be reduced.

When the number of tracks between the current position and the objective track (track C) becomes smaller than the preset track number, the servo processor 7 stops the thread 11. Specifically, at the timing ta when the center of the lens 4a reaches track B, braking is applied so as to stop the thread 11. Thereafter, the lens 4a is moved to objective track C by the constant speed control using the actuator (s7→s10).

At this time also, the RF amplifier 8 supplies the tracking error signal TE which is produced on the basis of the input from the pickup head 4, to the servo processor 7. The servo processor 7 conducts a constant speed control at a preset constant velocity till the center of the lens 4a reaches a position which is a half track short of track C.

Figure 6:
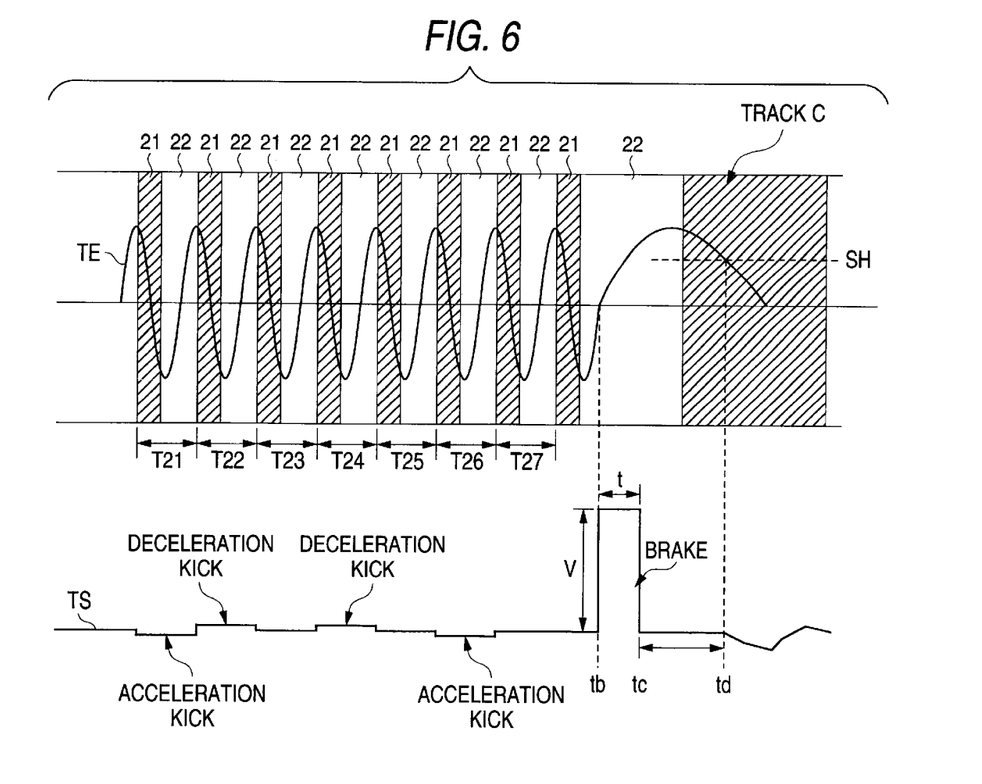
FIG. 6 is a view illustrating a control of movement of the holder, and a timing of applying a tracking servo control in the optical disc apparatus of the embodiment of the invention.

In the constant speed control of s10, a tracking servo signal TS for giving an acceleration kick or a deceleration kick is supplied to the tracking driver 5 so that the period (T21 to T27) of the tracking error signal TE supplied from the RF amplifier 8 becomes equal to a preset period (see FIG. 6).

By contrast, if it is judged in s2 above that the track number is smaller than the preset track number, the tracking servo control is turned off to cancel the track-on state, and an acceleration kick of a predetermined degree is given to the actuator (an acceleration kick signal of a predetermined level is supplied to the tracking driver 5) (s8 and s9). Thereafter, the lens 4a is moved toward objective track C by a constant speed control using the actuator (s10).

When the center of the lens 4a reaches the position which is a half track short of track C (tb shown in FIG. 6), the servo processor 7 calculates the amount of braking for stopping the movement of the lens 4a on the basis of the movement velocity of the lens 4a at the timing when the lens crosses the immediately preceding track (s11 →s12), and braking of the amount calculated in s12 is then applied (s13). Specifically, the amount of braking is calculated on the basis of the period (T27 in FIG. 6) of the sinusoidal wave of the tracking error signal TE which is supplied from the RF amplifier 8, the sinusoidal wave being produced when the lens crosses the immediately preceding track, and the tracking servo signal TS for applying braking of the calculated amount is supplied to the tracking driver 5.

The amount of braking may be controlled by controlling one or both of the time period t of application of braking and the degree V of braking.

After the brake signal is output, the servo processor 7 holds the actuator, and waits for the tracking error signal TE which is supplied from the RF amplifier 8, to be lowered below a preset threshold SH (s14 and s15). The holding of the actuator means that the input to the tracking driver 5 is set to zero.

At this time, the lens 4a is not completely stopped, but is moved toward track C at a velocity which is close to zero.

When the level of the tracking error signal TE is lowered below the threshold SH, the servo processor 7 supplies the tracking servo signal TS for applying a tracking servo control, to the tracking driver 5 (s16).

As shown in FIG. 6, the threshold SH is set to a level at which the center of the lens 4a is positioned on track C. During a period between a timing tc when braking is ended and a timing td when the level of the tracking error signal TE is lowered below the threshold SH, the servo processor 7 maintains the tracking servo signal TS to a level at which an acceleration kick or a deceleration kick is not given to the tracking driver 5 (the actuator is held).

Therefore, the tracking servo control can be applied when the center of the lens 4a is positioned on the objective track (track C in FIG. 6).

In the above description, the tracking servo control is applied when the level of the tracking error signal TE is lowered below the threshold SH. Alternatively, the tracking servo control may be applied when the level of the tracking error signal TE is within a predetermined range and is lowering.

When the tracking servo control is applied, the servo processor 7 outputs a focus servo signal to conduct also focus adjustment on the lens 4a. The focus adjustment is conducted by driving the lens by a focusing actuator which is not shown.

As described above, in the optical disc apparatus 1 of the embodiment, braking for stopping the center of the lens 4a on the objective track 21 in a track jump is adjusted to an amount corresponding to the movement velocity of the lens 4a immediately before the braking. Therefore, the lens does not overshoot the objective track.

The tracking servo control is not conducted immediately after a braking operation is completed, but is conducted after the center of the lens 4a is positioned on the objective track. Therefore, the tracking servo control is not conducted while the center of the lens 4a is positioned in the mirror portion 22, with the result that track slipping is prevented from occurring.

Consequently, a track-on in an objective track can be surely attained by a track jump operation, and hence the reliability of the apparatus main unit is improved.

[Effects of the Invention]

As described above, according to the invention, a track-on in an objective track can be surely attained by a track jump operation. Therefore, it is not necessary to again conduct a track jump, and the reliability of the apparatus main unit can be improved.

[FIG. 1]

1: OPTICAL DISC APPARATUS
2: CONTROL SECTION

3: MOTOR
5: TRACKING DRIVER
6: THREAD DRIVER
7: SERVO PROCESSOR
8: RF AMPLIFIER

[FIG. 2]

A: MOVEMENT DIRECTION OF THREAD
B: ROTATION DIRECTION OF HOLDER

[FIG. 3]

A: TRACK A
B: TRACK B
C: TRACK C

[FIG. 4]

A: TRACK JUMP
s1: CALCULATE NUMBER OF TRACKS TO BE JUMPED
s2: EQUAL TO OR LARGER THAN PRESET TRACK NUMBER!
s3: GIVE ACCELERATION KICK TO THREAD MOTOR
s4: TURN OFF TRACKING SERVO
s5: GIVE ACCELERATION KICK TO ACTUATOR
s6: CONSTANT SPEED CONTROL BY THREAD AND ACTUATOR
s7: SMALLER THAN PRESET TRACK NUMBER!
s8: TURN OFF TRACKING SERVO
s9: GIVE ACCELERATION KICK TO ACTUATOR
s10: CONSTANT SPEED CONTROL BY ACTUATOR
s11: A HALF TRACK SHORT OF A TRACK!
s12: CALCULATE AMOUNT OF BRAKING ON THE BASIS OF IMMEDIATELY PREVIOUS PERIOD OF TE
s13: APPLY BRAKING TO ACTUATOR
s14: HOLD ACTUATOR
s15: TE IS LOWERED BELOW SH!
s16: APPLY TRACKING SERVO CONTROL
B: END

[FIG. 5]

A: TRACK B

[FIG. 6]

A: TRACK C
B: ACCELERATION KICK
C: DECELERATION KICK
D: BRAKE

What is claimed is:

1. An optical disc apparatus comprising:
a pickup head which illuminates a recording surface of an optical disc with a light beam that is focused by a lens, and which detects a reflected light beam from the surface to read data recorded on said optical disc;
a lens moving section which moves said lens to move an illumination position of the light beam in a radial direction of said optical disc;
a tracking error signal producing section which produces a tracking error signal indicating that the illumination position of the light beam crosses a track formed on said optical disc;
a track position detecting section which detects a track position illuminated with the light beam, on the basis of the tracking error signal;
a brake signal outputting section which, when the illumination position of the light beam detected by said track position detecting section is moved a half track short of an objective track, outputs a brake signal for stopping said lens, to said lens moving section;
an amount of braking controlling section which controls a level of the brake signal that is output by said brake signal outputting section, and a time period when the brake signal is output, in accordance with a period of the tracking error signal; and
a tracking servo controlling section which, when a level of the tracking error signal is lowered below a predetermined level after the output of the brake signal by said brake signal outputting section is completed, starts application of a tracking servo control.

2. An optical disc apparatus comprising:
a pickup head which illuminates a recording surface of an optical disc with a light beam that is focused by a lens, and which detects a reflected light beam from the surface to read data recorded on said optical disc;
a lens moving section which moves said lens to move an illumination position of the light beam in a radial direction of said optical disc;
a tracking error signal producing section which produces a tracking error signal indicating that the illumination position of the light beam crosses a track formed on said optical disc;
a brake signal outputting section which outputs a brake signal for causing said lens moving section to stop said lens which is being moved in a radial direction of said optical disc;
an amount of braking controlling section which controls an amount of braking due to the brake signal that is output by said brake signal outputting section, in accordance with a period of the tracking error signal; and
a track position detecting section which detects a track position illuminated with the light beam, on the basis of the tracking error signal, wherein
said brake signal outputting section outputs the brake signal, when the illumination position of the light beam detected by said track position detecting section is moved a predetermined distance short of an objective track.

3. The optical disc apparatus according to claim 2, wherein said amount of braking controlling section controls a level of the brake signal.

4. The optical disc apparatus according to claim 2, wherein said amount of braking controlling section controls a time period when the brake signal is output.

5. The optical disc apparatus according to claim 2, wherein said amount of braking controlling section controls a level of the brake signal, and a time period when the brake signal is output.

6. The optical disc apparatus according to claim 2, wherein said predetermined distance is a half track.

7. The optical disc apparatus according to claim 2, further comprising:
a tracking servo controlling section which, when the illumination position of the light beam is placed on said track after the output of the brake signal by said brake signal outputting section is completed, starts application of a tracking servo control.

8. An optical disc apparatus comprising:
a pickup head which illuminates a recording surface of an optical disc with a light beam that is focused by a lens, and which detects a reflected light beam from the surface to read data recorded on said optical disc;

a lens moving section which moves said lens to move an illumination position of the light beam in a radial direction of said optical disc;

a tracking error signal producing section which produces a tracking error signal indicating that the illumination position of the light beam crosses a track formed on said optical disc;

a brake signal outputting section which outputs a brake signal for causing said lens moving section to stop said lens which is being moved in a radial direction of said optical disc; and a tracking servo controlling section which, when a level of the tracking error signal is lowered below a predetermined level after the output of the brake signal by said brake signal outputting section is completed, starts application of a tracking servo control, wherein there is a time period between a timing when the output of the brake signal is completed and a timing when the level of the tracking error signal is lowered below the predetermined level.

9. The optical disc apparatus according to claim 7, wherein said tracking servo controlling section starts application of a tracking servo control when a level of the tracking error signal is lowered below a predetermined level.

10. The optical disc apparatus according to claim 7, wherein said tracking servo controlling section starts application of a tracking servo control when a level of the tracking error signal is within a predetermined range and is lowering.

11. The optical disc apparatus according to claim 8, wherein said tracking servo controlling section starts application of a tracking servo control when a level of the tracking error signal is lowered below a predetermined level.

12. The optical disc apparatus according to claim 8, wherein said tracking servo controlling section starts application of a tracking servo control when a level of the tracking error signal is within a predetermined range and is lowering.

\* \* \* \* \*